(12) United States Patent
Zimmer et al.

(10) Patent No.: US 11,447,103 B2
(45) Date of Patent: Sep. 20, 2022

(54) ARRANGEMENT OF NOZZLE UNITS FOR A WIPER ARM, WIPER ARM AND USE OF A NOZZLE UNIT

(71) Applicant: A. RAYMOND ET CIE, Grenoble (FR)

(72) Inventors: Jochen Zimmer, Görwihl (DE); Axel Feger, Lörrach (DE)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 16/772,482

(22) PCT Filed: Dec. 18, 2018

(86) PCT No.: PCT/EP2018/085529
§ 371 (c)(1),
(2) Date: Jun. 12, 2020

(87) PCT Pub. No.: WO2019/121704
PCT Pub. Date: Jun. 27, 2019

(65) Prior Publication Data
US 2020/0398796 A1      Dec. 24, 2020

(30) Foreign Application Priority Data
Dec. 22, 2017   (DE) .......................... 102017012038.2

(51) Int. Cl.
*B60S 1/52*      (2006.01)
*B60S 1/34*      (2006.01)

(52) U.S. Cl.
CPC ............. *B60S 1/522* (2013.01); *B60S 1/3415* (2013.01)

(58) Field of Classification Search
CPC ....... B60S 1/522; B60S 1/3415; B60S 1/3805
See application file for complete search history.

(56) References Cited

U.S. PATENT DOCUMENTS

| 5,842,251 A | 12/1998 | LeFrancois et al. |
| 6,286,174 B1 | 9/2001 | Zimmer |

(Continued)

FOREIGN PATENT DOCUMENTS

| DE | 19904964 A1 | 8/2000 |
| DE | 69719685 T2 | 11/2003 |

(Continued)

OTHER PUBLICATIONS

English translation of International Search Report for PCT/EP2018/085529 dated Apr. 8, 2019, 3 pages.

(Continued)

*Primary Examiner* — Andrew A Horton
(74) *Attorney, Agent, or Firm* — Warner Norcross + Judd LLP (57) ABSTRACT

Disclosed is an arrangement of nozzle units for a wiper arm, wherein at least one nozzle unit comprises a rigid body, has a channel through which liquid can flow into the nozzle unit and/or out of the nozzle unit, and comprises a nozzle, which is connected to the channel. The nozzle units are in communication with each other in series such that a liquid can flow from a nozzle unit into a following nozzle unit in the series, wherein at least one nozzle unit has a contact surface which is formed such that the nozzle unit cannot rotate about the longitudinal axis thereof if the contact surface contacts a surface of a wiper arm. A wiper arm comprising the arrangement is also disclosed.

14 Claims, 7 Drawing Sheets

(56) References Cited

U.S. PATENT DOCUMENTS

| | | | |
|---|---|---|---|
| 6,442,788 B1 | 9/2002 | Fleischer | |
| 6,520,424 B1 | 2/2003 | Lesser et al. | |
| 2003/0009841 A1* | 1/2003 | Sato | B60S 1/3415 15/250.04 |
| 2007/0018012 A1 | 1/2007 | Harris et al. | |
| 2013/0269139 A1 | 10/2013 | Wolfgarten | |
| 2015/0113754 A1* | 4/2015 | Umeno | B60S 1/482 15/250.04 |
| 2015/0274127 A1 | 10/2015 | Burkard et al. | |
| 2016/0121853 A1* | 5/2016 | Uchiyama | B60S 1/3468 15/250.04 |
| 2019/0225190 A1 | 6/2019 | Zimmer et al. | |

FOREIGN PATENT DOCUMENTS

| | | |
|---|---|---|
| DE | 102010064178 A1 | 6/2012 |
| DE | 102013212055 A1 | 1/2015 |
| DE | 102014220418 A1 | 4/2015 |
| DE | 102014205538 A1 | 10/2015 |
| DE | 102014225377 A1 | 6/2016 |
| DE | 102015210746 A1 | 9/2016 |
| DE | 102015215932 A1 | 2/2017 |
| DE | 102015015553 A1 | 6/2017 |
| EP | 3230133 A1 | 10/2017 |
| FR | 3007364 A1 | 12/2014 |
| WO | 199928171 A1 | 6/1999 |
| WO | 200012361 A1 | 3/2000 |
| WO | 2018068892 A1 | 4/2018 |

OTHER PUBLICATIONS

Machine assisted English translation of FR3007364A1 obtained htttps://patents.google.com/patent from on Jun. 10, 2020, 6 pages.
Machine assisted English translation of DE102013212055A1 obtained htttps://patents.google.com/patent from on Jun. 10, 2020, 7 pages.
Machine assisted English translation of DE102014225377A1 obtained htttps://patents.google.com/patent from on Jun. 10, 2020, 8 pages.
Machine assisted English translation of DE102015210746A1 obtained htttps://patents.google.com/patent from on Jun. 10, 2020, 7 pages.
Machine assisted English translation of DE102015215932A1 obtained htttps://patents.google.com/patent from on Jun. 10, 2020, 6 pages.
Machine assisted English translation of EP3230133A1 obtained htttps://patents.google.com/patent from on Jun. 10, 2020, 9 pages.

* cited by examiner

ARRANGEMENT OF NOZZLE UNITS FOR A WIPER ARM, WIPER ARM AND USE OF A NOZZLE UNIT

CROSS-REFERENCE TO RELATED APPLICATIONS

This application is the National Stage of International Application No. PCT/EP2018/085529, filed on 18 Dec. 2018, which claims priority to and all advantages of German Patent Application No. 10 2017 012 038.2, filed on 22 Dec. 2017, the contents of which are hereby incorporated by reference.

FIELD OF THE INVENTION

The present invention generally relates to a nozzle unit and an arrangement of nozzle units for a wiper arm. The invention further relates to a wiper arm and to a use of a nozzle unit for fastening to a surface of a wiper arm.

BACKGROUND OF THE INVENTION

A wiper arm is generally known in which a perforated hose is arranged, wherein the holes in the hose serve as nozzles in order to apply a liquid flowing through the hose to a car windshield. A disadvantage of this, however, is that the holes can only be produced such that the holes are subject to a wide tolerance range because of the elastic property of the tube. In addition, the holes are lasered, and the hose and thus the holes can become larger when placed under pressure. Furthermore, because of the elastic behavior of the hose, the hose can twist during installation or during operation, so that the nozzles no longer have the desired orientation. Overall, these disadvantages lead to the liquid not being applied to the car windshield with the stream thickness, coverage and accuracy required or desired for cleaning.

DE 10 2015 210 746 A1 generally discloses a wiper arm in which, instead of a hose, an arrangement of two tubes which are connected to one another in an articulated manner by a tubular connecting piece made of hard plastic is used. In one embodiment, both the connecting piece and each tube have a perforation for applying liquid to a windshield. However, the arrangement of tubes and connecting pieces has no anti-twist protection, so that during operation, especially as a result of the dynamics of the wiper arm or when the wiper blade is replaced, the orientation of the perforation changes.

A nozzle unit is generally known from the unexamined application DE 10 2014 205 538 A1. The nozzle unit comprises a flat surface that is generally suitable for preventing the nozzle unit from rotating about the longitudinal axis thereof if the flat surface contacts a surface of a wiper arm. However, the connection between the nozzle unit and the wiper arm is not accomplished by means of the surface, but by notches. In the assembled state, the nozzle unit is located on an outer side of the wiper arm.

SUMMARY OF THE INVENTION

An arrangement of nozzle units for a wiper arm is disclosed, wherein at least one nozzle unit comprises a rigid body, defines a channel through which liquid can flow into the nozzle unit and/or out of the nozzle unit, and comprises a nozzle, which is connected to the channel. The nozzle units are in communication with each other in series in the arrangement such that a liquid can flow from a nozzle unit into a following nozzle unit in the series. At least one nozzle unit comprises a contact surface which is formed such that the nozzle unit cannot rotate about the longitudinal axis thereof if the contact surface contacts a surface of a wiper arm.

Generally, the nozzle unit is adapted to prevent rotation about the longitudinal axis of the wiper arm by a simple form-fitting connection thereto. The provision of a flat contact surface facilitates assembly and ensures that the nozzle orientation does not change inadvertently after assembly. The accuracy with which the liquid is applied to the windshield is thus continuously maintained.

According to the invention, the nozzle unit comprise or is formed as a rigid body. As a result, the nozzle can be incorporated into the nozzle unit with a higher manufacturing accuracy than is the case with a hose of the aforementioned type. In addition, the nozzle unit does not deform and cause a change of the nozzle's orientation. Typically, the rigid body has more material than the hose wall, so that the rigid body provides better conditions for incorporating a larger number of different nozzle shapes therein. The nozzle unit according to the invention can also be produced as an injection-molded part, which in turn increases geometric freedom compared to an extruded hose. In this way, almost any geometry can be realized with the nozzle unit according to the invention in the region of the nozzle outlet without, for example, the entire wall thickness having to be thickened for this purpose (which would affect the cycle time during injection molding). These advantages result in the arrangement according to the invention increasing the accuracy and the quality of the application of a liquid to a windshield.

The rigid body may be made of various suitable materials or combinations of materials. The materials or combinations of materials are especially suitable if they can ensure the rigid property of the body. Not only metals, but also plastics, especially thermoplastics, come into consideration for this purpose. A specific suitable thermoplastic material is polyoxymethylene (POM).

According to the invention, the nozzle unit defines a channel through which liquid can flow into the nozzle unit and/or out of the nozzle unit. The channel is therefore a recess within the nozzle unit. In some embodiments, the channel is produced using the same manufacturing methods as the nozzle (see below), especially by injection-molding simultaneously with the rigid body and the nozzle. Nozzle units which are arranged in series between two further nozzle units conveniently define a channel through which liquid can flow into the nozzle unit and flow out of the nozzle unit. Nozzle units which form the end of the row conveniently define a channel through which liquid can flow only into the nozzle unit, but cannot flow out of the nozzle unit via the channel but instead via the nozzle. A nozzle unit forms an end of the row if it is intended to allow the liquid to exit via the nozzle, but not to pass it to another nozzle unit, to a hose or the like.

A nozzle unit which forms the end of a row can be designed, for example, in the manner shown in FIGS. 5 to 9 of DE 10 2015 015 553 A1.

According to the invention, the nozzle unit comprises a nozzle which is connected to the channel. "Connected" in this context means that liquid can be conducted from the channel to the nozzle. It is conceivable for a nozzle unit to have not only one nozzle but a plurality of nozzles. There are several possibilities for manufacturing the nozzle. One possibility for manufacturing the nozzle body and the nozzle simultaneously is injection molding. A further example is machining. The shape of the nozzle in particular affects the shape, velocity, and coverage of the liquid stream as the liquid exits the nozzle.

According to the invention, the nozzle units are in communication with and/or connected to one another in series in such a way that a liquid can flow from a nozzle unit into a following nozzle unit in the series.

For the purposes of the invention, "following in the series" refers to the property of a nozzle unit of being arranged with respect to a reference nozzle unit in such a way that no third nozzle unit is arranged in the series between these nozzle units.

In order for a liquid to be able to flow from one nozzle unit into a following nozzle unit in the series, these nozzle units are connected to one another in such a way that their channels are in communication with and/or connected to one another. This is the case when their channels directly connect to one another, so that the liquid that flows out of one channel flows directly into the other channel. Alternatively, this is also the case if their channels are connected to one another via an intermediate line, such as a hose segment, so that the liquid flows via the intermediate line from one channel to the other.

According to the invention, at least one nozzle unit comprises a contact surface which is formed such that this nozzle unit cannot rotate about the longitudinal axis thereof if the contact surface contacts a surface of a wiper arm.

The contact surface is typically flat. The contact surface is typically advantageously parallel to the longitudinal axis of the nozzle unit. The rotation of the nozzle unit about the longitudinal axis thereof is especially effectively prevented if the surface of the wiper arm is also flat or substantially planar (e.g. slightly curved).

In certain embodiments, the contact surface is formed flat and the contact surface extends parallel to the longitudinal axis, wherein the length of the contact surface in the direction of the longitudinal axis corresponds to at least 30%, alternatively at least 40%, alternatively at least 50%, alternatively at least 60%, alternatively at least 70% of the longitudinal extent of the nozzle unit.

In some embodiments, the contact surface is planar and formed to have a first side and a second side opposite and parallel to the first side. The contact surface is typically rectangular. In some embodiments, the contact surface transitions tangentially on one side into a curved surface section of the nozzle unit. The contact surface can transition via an edge into a surface section of the nozzle unit which adjoins the contact surface and is likewise planar. In particular embodiments, a nozzle of the nozzle unit is configured in the planar surface section of the nozzle unit into which the contact surface transitions by means of the edge.

In some embodiments, several of the nozzle units, alternatively a majority of nozzle units and alternatively all nozzle units, have a contact surface according to the invention, so that the orientation of all nozzles can be maintained continuously.

In certain embodiments, a plurality of the nozzle units have a contact surface, the contact surfaces of the plurality of nozzle units which have a contact surface lie in one plane, alternatively the contact surfaces of all nozzle units which have a contact surface lie in one plane, According to the invention, the nozzle units are connected in series to each other, the term "connected" in this context comprising the alternative embodiments that the nozzle units are connected to each other either directly or indirectly. The nozzle units are directly connected to each other if they touch each other. They are indirectly connected to one another if they do not touch one another and are connected to one another via a middle piece. A hose segment is generally the middle piece. In some embodiments, a tube is the middle piece. According to one possible embodiment, all successive nozzle units are connected to one another via a middle piece, typically a hose segment.

In some embodiments, at least two nozzle units arranged in series are connected to each other in an articulated manner. This is typically a hinge joint, or alternatively a ball joint. As a result, the arrangement achieves a mobility which allows the arrangement to be attached to non-planar surfaces of a wiper arm.

In an alternative embodiment, at least two successive nozzle units are rigidly connected to one another, i.e. they have no degree of freedom relative to one another. In some embodiments, all successive nozzle units to be rigidly connected to one another.

In particular embodiments, one of the two nozzle units comprises an elastic insert and the other comprises a rigid hollow counterpart, the insert being intended to penetrate into the rigid hollow counterpart to thereby achieve the articulated connection. Alternatively, it is also possible for one of the two nozzle units to have a rigid insert and the other to have an elastic hollow counterpart, the insert being intended to penetrate into the elastic hollow counterpart in order to thereby achieve the articulated connection. The elastic insert or the elastic hollow counterpart is thus made of a different material than the nozzle unit, since the latter is formed from a rigid body. Thus, the nozzle unit which comprises an elastic insert or an elastic hollow counterpart comprises at least two materials or material combinations, namely the material or the material combination of the rigid body and the material or material combination of the elastic insert or of the elastic hollow counterpart.

Such embodiments enable simple and rapid assembly, in that the insert need only be inserted into the counterpart without the use of additional fastening means such as screws. Disassembly can also be carried out simply and quickly, for example for repair or replacement purposes.

The connection can be realized, for example, by a press fit. The oversizing can be effected by elastic compression (of the insert) or widening (of the hollow counterpart) of the elastic piece during insertion.

According to some embodiments, all nozzles have the same orientation. The "orientation" is determined by the position of the nozzle axis in the nozzle unit. Which reference elements can be used to determine the position of the nozzle axis depends on the shape of the nozzle unit. The longitudinal axis of the nozzle typically serves as a reference element, the angle between this longitudinal axis and the nozzle axis being a parameter of the position of the nozzle axis. Another reference element may be the contact surface according to the invention, which is flat, so that the angle between the contact surface and the nozzle axis is another parameter. For the purposes of the invention, nozzles have the same orientation if their nozzle axes are parallel.

In certain embodiments, at least two nozzles are oriented differently. For example, a portion of the nozzles may be oriented to apply the liquid above a wiper blade and another portion to apply the liquid below the wiper blade. Such application would be possible, for example, with two separately connected or supplied strands (channels in the nozzle unit) so that the two nozzles cannot spray at the same time but rather the timing is offset. The nozzles of the first-mentioned part can advantageously be actuated during the upward movement of the wiper blade, whereas the nozzles of the last-mentioned part are actuated during the downward movement of the wiper blade. Thus, for example, windshields can be cleaned more quickly and more thoroughly and applied windshield cleaners can be wiped away immediately without impeding the driver's view for a longer time.

In particular embodiments, at least one nozzle unit has a different shape than another nozzle unit. In certain embodiments, at least one nozzle unit is to be made of a different material or of a different material combination than another nozzle unit. As a result, appropriate nozzle units can be selected in the manner of a modular system as needed. The need for nozzle units that differ in shape and material can result, for example, from the shape of the wiper arm or from components which have to be connected to the arrangement. For example, some nozzle units may have additional connection elements or differ in length from other nozzle units so that the entire arrangement fits into the wiper arm. It is also conceivable for one nozzle unit to have a different nozzle geometry than another nozzle unit. The nozzle shape may be round, oval or rectangular, for example.

According to particular embodiments, at least one nozzle unit comprises a conductor segment of a conductor for a heating unit, wherein the conductor segment comprises at least one connection for another conductor segment. The heating unit serves in particular to defrost liquid lines of a windshield wiper system. Liquid lines of the arrangement according to the invention are the channels, nozzles and/or middle pieces (e.g. hose segments).

The conductor segment is advantageously arranged in the channel of the nozzle unit, so that iced up liquid in the channel is in direct contact with the conductor segment and thereby thaws rapidly. The conductor segment can also be additionally arranged in the nozzle.

The term "other conductor segment" includes in particular conductor segments of different nozzle units which for their part have a connection for a conductor that is yet again different. Thus, two successive nozzle units, each having a conductor segment and a connection for another conductor segment, can be connected to one another in such a way that the conductor segments are electrically connected via the connections of the conductor segments.

A conductor segment of a nozzle unit arranged in series between two other nozzle units comprises two terminals, so the nozzle unit is electrically connectable to the conductor segments of the adjacent nozzle elements.

In certain embodiments, the nozzle unit comprises a check valve.

In particular embodiments, the nozzle unit comprises an adjustable nozzle. This can be realized, for example, via a spherical nozzle insert which is arranged in a receptacle in the nozzle unit. A channel, at the outwardly directed end of which the liquid is sprayed, leads through the nozzle insert. By virtue of the spherical shape of the nozzle insert, the orientation of the channel leading through the nozzle insert can be adjusted and thereby the nozzle adjusted.

In some embodiments, the rib comprises a nozzle chip. A nozzle chip is described, for example, in WO 00/12361 A1, the contents of which are incorporated by reference into this description for the description of the construction of a nozzle chip.

Furthermore, the invention relates to a wiper arm having the arrangement according to the invention. In some embodiments, the contact surface of at least one nozzle unit, alternatively the plurality of nozzle units, alternatively all nozzle units, contacts a corresponding surface of the wiper arm in the installed state. The wiper arm advantageously has a U-shaped cross section or an add-on part with a U-shaped cross section. As a result, the wiper arm has essentially three main surfaces which extend along the longitudinal axis thereof: two side flanks and one base side, where the base side is connected to the side flanks. The side flanks and the base side define an internal space. In the case of a wiper arm with add-on part having a U-shaped cross section, the wiper arm can comprise a base body which is formed from a flat bar.

According to some embodiments of the wiper arm according to the invention, the wiper arm defines a base side and two side flanks, the base side and the side flanks extending in the longitudinal direction of the wiper arm. The base side is connected to the side flanks in such that the wiper arm has an essentially U-shaped cross section and the base side and the side flanks define an internal space. The arrangement is arranged in the internal space, and the contact surface of the at least one nozzle unit contacts the surface of one of the two side flanks.

The invention further relates to a use of a nozzle unit which is formed as a rigid body and defines a channel through which liquid can flow into the nozzle unit and/or out of the nozzle unit, a nozzle which is connected to the channel, and a contact surface, such that the nozzle unit cannot rotate about the longitudinal axis thereof if the contact surface contacts a surface of a wiper arm.

The nozzle unit to be used may comprise one or more features of a nozzle unit described above in the context of the description of the arrangement according to the invention.

The use typically comprises the use of a plurality of such nozzle units to form an arrangement according to the invention, wherein in particular the number of nozzle units used is matched to the length of the wiper arm.

The invention also relates to a nozzle unit which: comprises a rigid body, defines a channel through which liquid can flow into the nozzle unit and/or out of the nozzle unit, comprises a nozzle connected to the channel, and comprises a contact surface formed such that the nozzle unit cannot rotate about the longitudinal axis thereof when the contact surface contacts a surface of a wiper arm, the nozzle unit being composed of a base body extending along a longitudinal axis through which the channel passes, the base body having surface portions which are not arranged in planes perpendicular to the longitudinal axis and are curved.

In particular embodiments, some, alternatively a majority, alternatively all of the surface sections which have a curved design are either curved around the longitudinal axis or an axis parallel to the longitudinal axis or are surface sections of a truncated cone whose longitudinal axis is the longitudinal axis of the base body or whose longitudinal axis is parallel to the longitudinal axis of the base body.

The nozzle unit can have flat surface sections running in planes perpendicular to the longitudinal axis of the base body. Such surface sections can be, for example, end surfaces which terminate the base body at the end.

In certain embodiments, the base body is rotationally symmetrical with respect to the longitudinal axis, with the exception of the contact surface formed thereon. Additionally or alternatively, the base body has, with the exception of the flat contact surface, at least predominantly, alternatively entirely only surface section curved around the longitudinal axis. Additionally or alternatively, the base body has, with the exception of the flat contact surface and the flat surface arranged in planes perpendicular to the longitudinal axis, at least predominantly, alternatively entirely only surface section curved around the longitudinal axis. Additionally or alternatively, the base body has, with the exception of the flat contact surface and flat surfaces transitioning with one edge into the flat contact surface and with the exception of flat surface possibly arranged in planes perpendicular to the longitudinal axis, at least predominantly, alternatively entirely only surface section curved around the longitudinal axis.

In some embodiments, the part of the total surface of the nozzle unit which is formed by surface sections curved around the longitudinal axis or an axis parallel to the longitudinal axis and—if present—by the surface sections of a truncated cone, the longitudinal axis of which is the longitudinal axis of the base body or the longitudinal axis of which is designed parallel to the longitudinal axis of the base body, corresponds to more than 40%, alternatively more than 50%, alternatively more than 60%, alternatively more than 70% of the total surface of the nozzle unit. The total surface area of the nozzle unit is determined by the sum of the areas of all surfaces whose surface normals point away from the nozzle unit (outer surfaces). The total surface area refers in particular to the total surface area of the nozzle unit in the assembled state.

The nozzle unit according to the invention may be used in the arrangement according to the invention.

The nozzle unit according to the invention may have one or more features of a nozzle unit described above in the context of the description of the arrangement according to the invention.

BRIEF DESCRIPTION OF THE DRAWINGS

The invention is described in greater detail below with reference to the accompanying drawings figures, in which.

DETAILED DESCRIPTION

Figure 1:
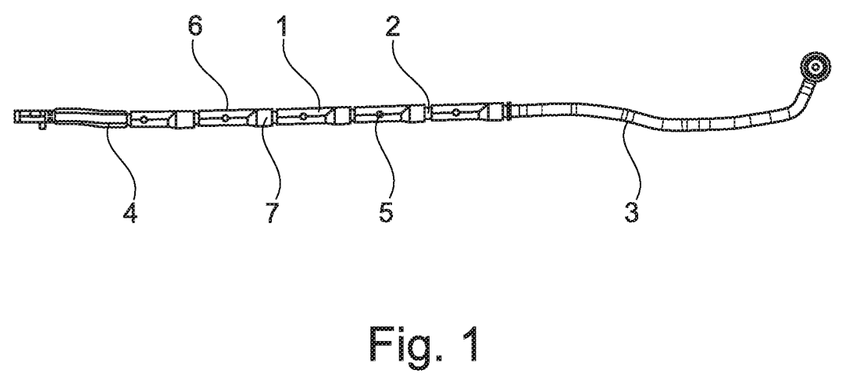
FIG. 1 shows a perspective view of an arrangement of nozzle units according to the invention.
Figure 2:
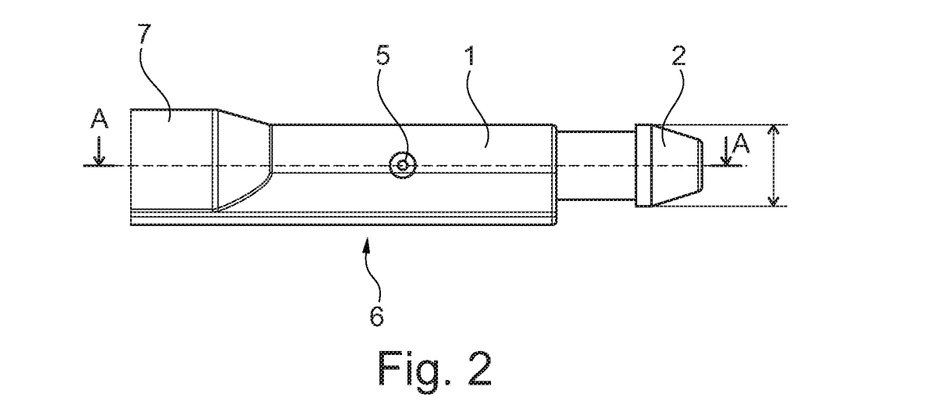
FIG. 2 shows a plan view of a nozzle unit of the arrangement according to FIG. 1.
Figure 3:
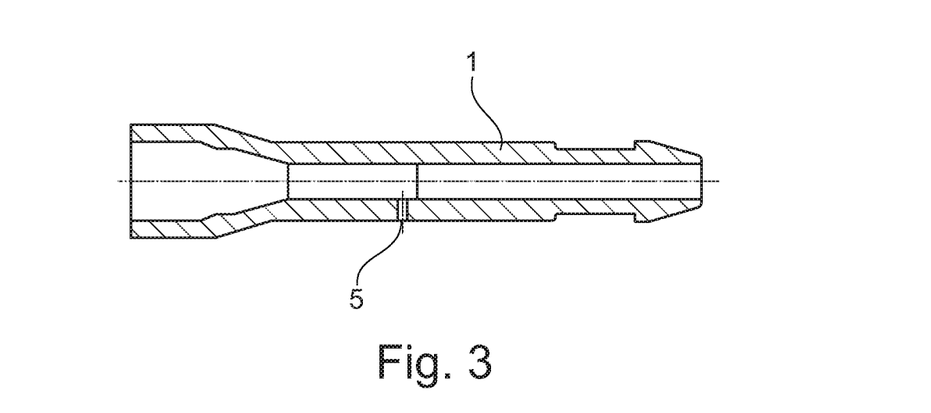
FIG. 3 shows a sectional view of the nozzle unit according to FIG. 1.

FIGS. 1 to 3 show an exemplary embodiment of the arrangement. The arrangement comprises five nozzle units 1 connected to each other in series. In this exemplary embodiment, the nozzle units 1 are connected directly to one another. To this end, each nozzle unit 1 comprises a rigid insert 2 and an elastic hollow counterpart 7. The insert 2 of a nozzle unit 1 is inserted into the elastic hollow counterpart 7 of a following nozzle unit 1 in the series. The arrangement is part of a line system of a windshield wiper system. For this purpose, the arrangement is connected on one side to a hose 3 for supplying a liquid, in particular a windshield cleaner, and on the other side to a hose segment 4 for conveying the liquid, for example to a nozzle fastened elsewhere.

In the present example, each nozzle unit 1 comprises a nozzle 5 for applying the liquid to an auto windshield. All nozzles 5 are oriented identically. Furthermore, each nozzle unit 1 has a flat contact surface 6. The contact surfaces 6 serve to contact a surface of a wiper arm (not shown), whereby the orientation of the nozzles 5 can be continuously maintained even if the nozzle units 1 are acted on by a non-uniform and strong fluid pressure.

In this exemplary embodiment, the rigid insert 2 and the elastic hollow counterpart 7 are formed such that there is an articulated connection between two successive nozzle units 1. Especially due to the elasticity of the hollow counterpart 7, the nozzle units 1 are connected to one another via a spherical joint, which can be seen in the figure because of the slightly oblique position of the outermost left nozzle unit 1. This allows the contact surfaces 6 to contact a surface of a wiper arm that is not flat (e.g., curved).

Figure 4:
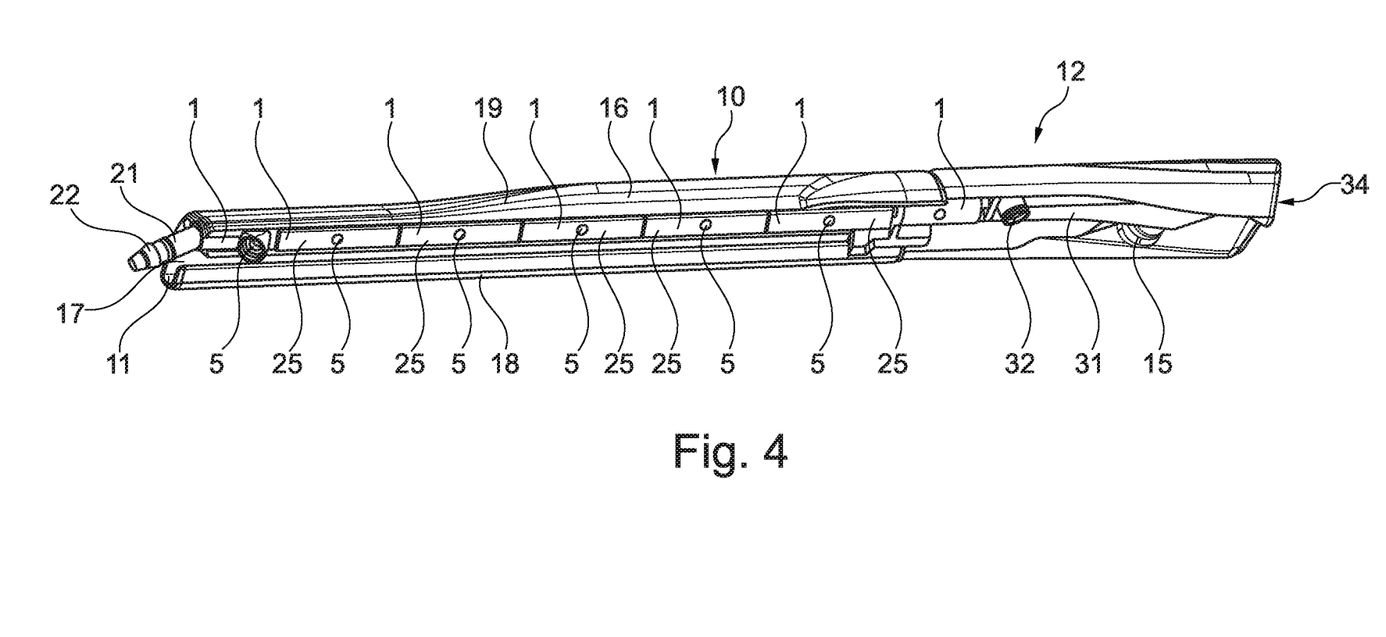
FIG. 4 shows a perspective view of a wiper arm without the supporting flat bar but with an end cap and an arrangement according to one embodiment of the invention.
Figure 5:
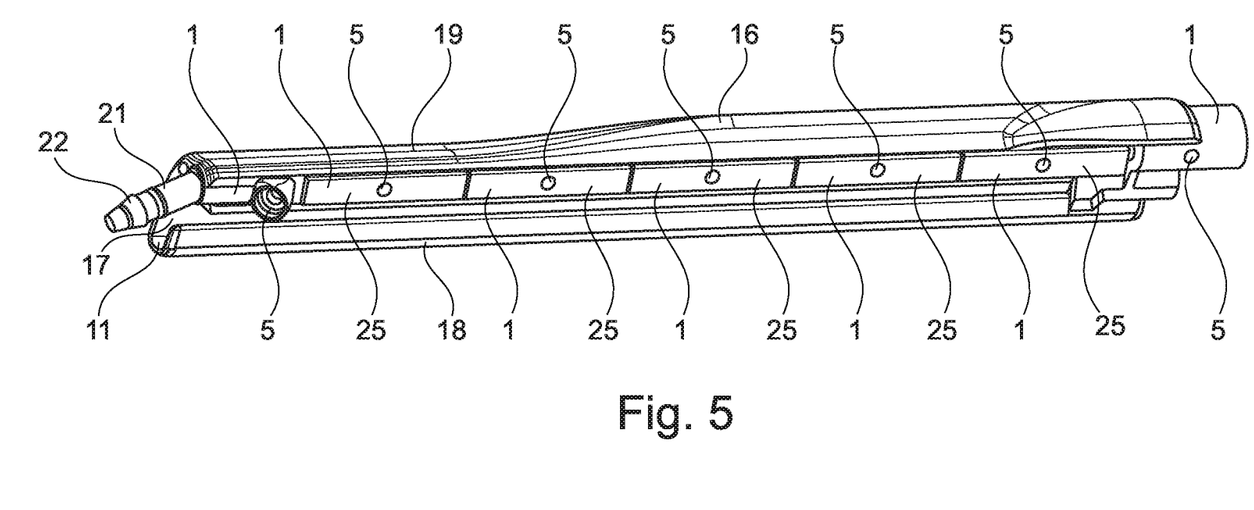
FIG. 5 shows a perspective view of the wiper arm according to FIG. 4 without the end cap.
Figure 7:
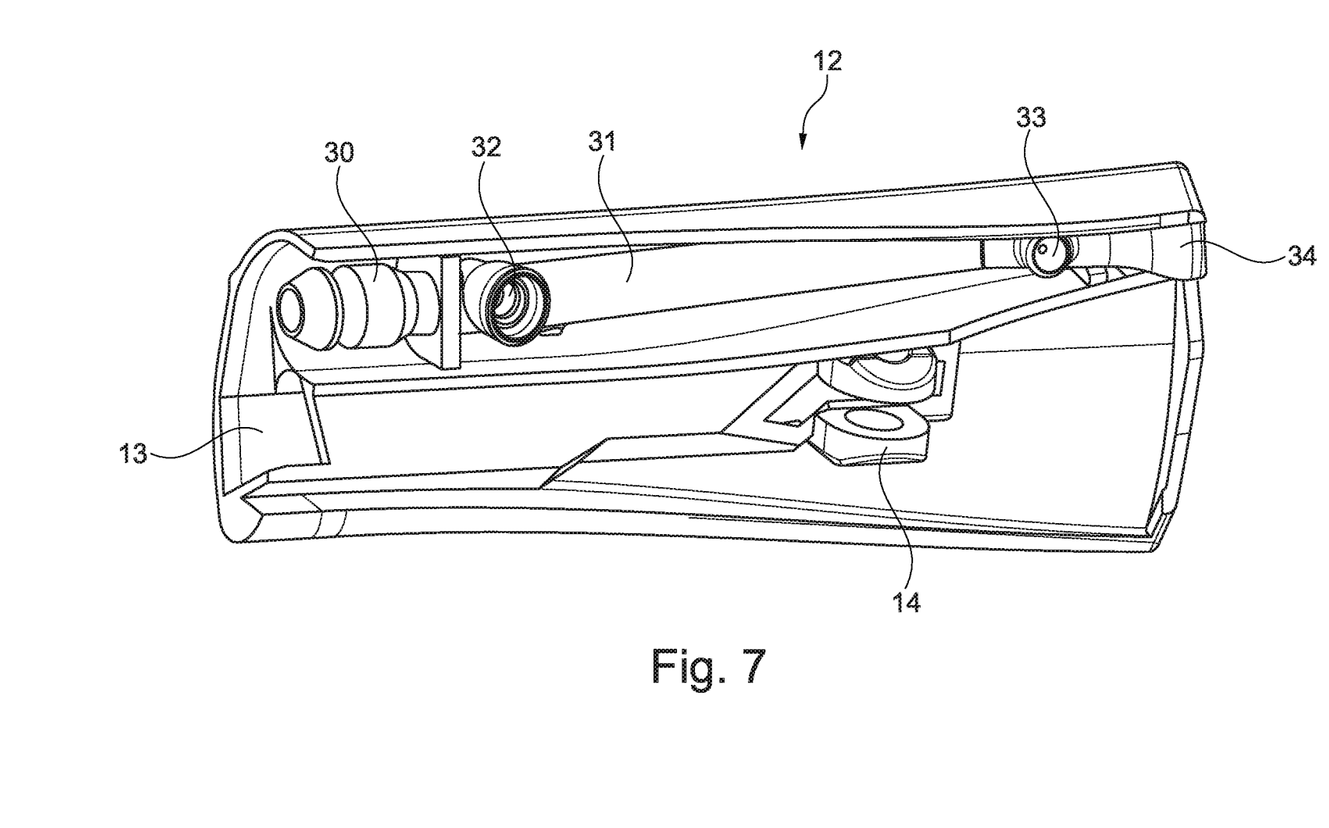
FIG. 7 shows a perspective view of the end cap of the wiper arm according to FIG. 4.
Figure 8:
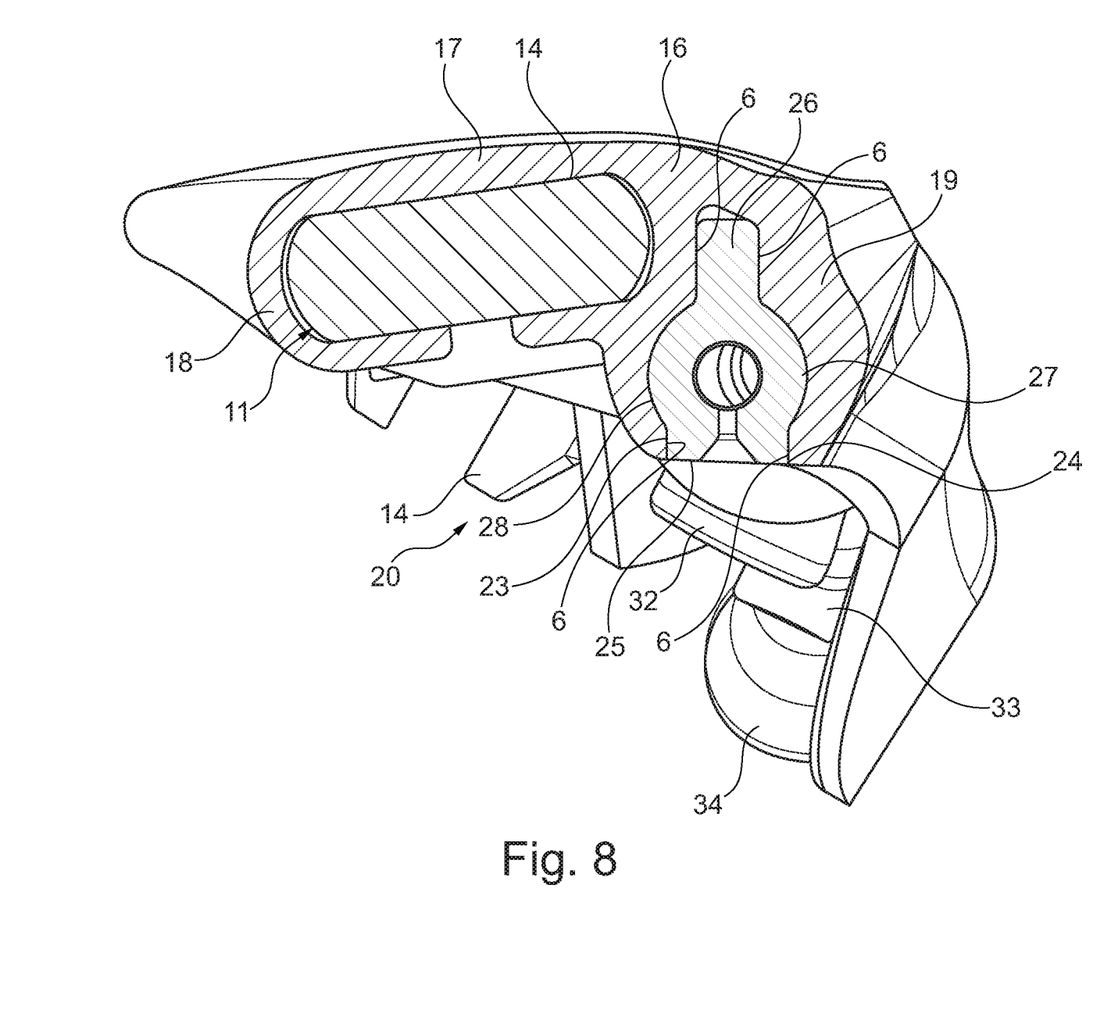
FIG. 8 shows a partially cut perspective view of the wiper arm according to FIG. 4.

FIG. 4 shows a perspective view of a wiper arm 10. The wiper arm 10 is shown in FIGS. 4, 5, 7 without the supporting flat bar via which the wiper arm 10 is connected to a vehicle and which carries the remaining parts of the wiper arm 10 and which brings about the pivoting movement of the remaining parts of the wiper arm 10 by its pivoting movement. FIGS. 4 and 5 show a receptacle 11 into which the flat bar can be inserted. FIG. 7 shows that the end cap 12 also comprises a receptacle 13 for receiving the flat bar. FIG. 8 shows the flat bar 14 in section view in the receptacle 11.

Also not shown in FIGS. 4 and 7 is the wiper blade. FIGS. 4 and 7 show a receptacle 15 which can be used as an articulated receptacle for a connecting piece of a wiper blade in order to connect the wiper blade such that the wiper blade can pivot with respect to the end cap 12 to the parts of the wiper arm 10 shown in FIG. 4. The wiper blade can be changed, for example, by removing the end cap 12 with the wiper blade attached thereto. FIG. 5 shows a wiper arm 10 with a removed end cap 12. A new wiper blade with new end cap 12 can then be put on in place of the removed end cap 12 with the used wiper blade.

The wiper arm 10 has an add-on part 16. The add-on part 16 comprises a base side 17 and two side flanks 18, 19 (cf. FIG. 8). The base side 17 and the side flanks 18, 19 extend in the longitudinal direction of the wiper arm 10. The base side 17 and the side flanks 18, 19 are designed such that the add-on part 16 of the wiper arm 10 has a substantially U-shaped cross section and the base side 17 and the side flanks 18, 19 define an internal space 20.

Figure 6:
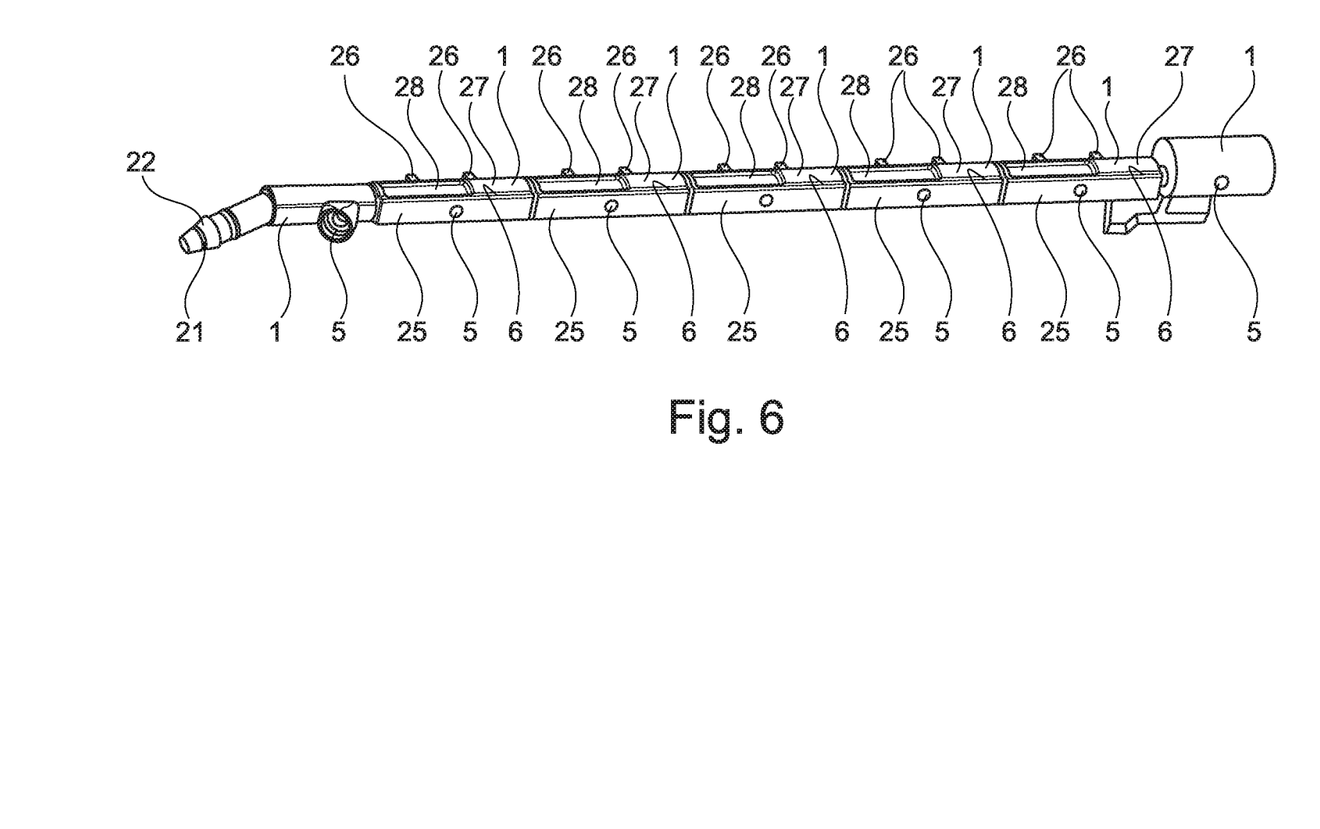
FIG. 6 shows a perspective view of the arrangement according to one embodiment of the invention installed in the wiper arm FIG. 4.

FIG. 6 shows the arrangement according to the invention installed in the wiper arm 10. The arrangement comprises nozzle units 1. Five of these nozzle units 1 are designed identically. The nozzle units 1 are each formed as a rigid body and have a channel through which liquid can flow into each nozzle unit 1 and out of each nozzle unit 1. Furthermore, each nozzle unit 1 comprises a nozzle 5 connected to the channel. The nozzle units 1 are connected in series to one another in such a way that a liquid can flow from a nozzle unit 1 into a following nozzle unit 1 in the series. In this case, the arrangement is connected via an end piece 21 shown on the right in FIG. 6 to a hose (not shown) or a differently designed liquid supply. In the embodiment shown in FIG. 6, the end piece 21 is mounted via a ball joint in the nozzle unit 1 immediately following the end piece 21 in the series and can thus be pivoted relative to the nozzle unit 1 immediately following the end piece 21 in the series. The truncated cone 22 of the end piece 21, which is of barb-shaped cross section, permits a secure insertion and connection of the end piece 21 to a hose (not shown).

The five identically designed nozzle units 1 each have an upper, flat contact surface 6 and a lower, flat contact surface 6 which are each formed such that this nozzle unit 1 cannot rotate about the longitudinal axis thereof if the respective contact surface 6 contacts a surface 23, 24 assigned thereto (cf. FIG. 8). The flat contact surfaces 6 transition via an edge into a planar side surface 25 of the respective nozzle unit 1. The outlet of each nozzle 5 is designed to be on the side face 25 in each case.

FIGS. 6 and 8 show that, with the exception of a rear stabilizing extension 26 on which contact surfaces 6 are likewise designed, the remaining surfaces of the five identically designed nozzle units 1 are designed curved around the longitudinal axis of the respective nozzle unit 1, like the surface sections 27, 28, 29, for example.

FIG. 6 shows that the transitions between the nozzle units 1 of the embodiment of FIGS. 4 to 8 are made narrower than the transitions of the identically designed nozzle units 1 of the exemplary embodiment of FIGS. 1 to 3.

Not shown in FIGS. 4 to 8, but easily inferable therefrom, the spray pattern of the wiper arm 10 can be adapted by varying the geometry of each nozzle unit 1, in particular its length, as well as by varying the type, geometry and number of the nozzles 5 and their arrangement on the nozzle unit 1 in each case. It is also immediately apparent that different lengths of the wiper arm 10 can be taken into account by selecting the number of nozzle units of the arrangement according to the invention.

The five identical nozzle units 1 of the arrangement according to the invention are closed off on the right in the illustration of FIGS. 4, 5, 6 by a further nozzle unit 1 with nozzle 5. This last nozzle unit 1 is designed as an adapter nozzle unit. The adapter nozzle unit is adapted to receive a connecting piece 30 of an end cap 12 of the wiper arm 10. The adapter nozzle unit and the connecting piece 30 are designed in such a way that on the one hand they allow the end cap 12 to be pulled off, for example for a wiper blade change, but on the other hand they permit both a simple pushing on of a new end cap 12 and also a good sealing connection between the adapter nozzle unit and the connecting piece 30. Liquid is conducted through the adapter nozzle unit and the connecting piece 30 into a manifold 31 of the end cap 12 and from there into the end cap nozzles 32, 33, 34 of the end cap 12. End cap nozzles 32, 33 spray predominantly perpendicularly to the longitudinal extent of a wiper blade (not shown), while the end cap nozzle 34 sprays mostly in the longitudinal direction of the wiper blade (not shown). Instead of the design specifically illustrated here, the end cap 12 can also be designed in the manner of the design of FIGS. 5 to 9 of DE 10 2015 015 553 A1, wherein a second arrangement of nozzle units for a second supply of liquid would be provided.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. An arrangement of nozzle units for a wiper arm, wherein at least one nozzle unit:
    comprises a rigid body;
    defines a channel through which liquid can flow into the nozzle unit and/or out of the nozzle unit; and
    comprises a nozzle, which is connected to the channel, wherein the nozzle units are in communication with each other in series in the arrangement such that a liquid can flow from a nozzle unit into a following nozzle unit in the series, and at least two nozzle units following each other in the series are directly connected to each other, and
    wherein at least one nozzle unit comprises a contact surface which is formed such that the nozzle unit cannot rotate about a longitudinal axis thereof if the contact surface contacts a surface of the wiper arm.

2. The arrangement according to claim 1, wherein at least two nozzle units following each other in the series are connected to each other in an articulated connection.

3. The arrangement according to claim 2, wherein one of the two nozzle units comprises a rigid insert and the other nozzle unit comprises an elastic hollow counterpart, the rigid insert being configured to penetrate the elastic hollow counterpart to provide the articulated connection.

4. The arrangement according to claim 1, wherein all of the nozzles have the same orientation.

5. A wiper arm comprising the arrangement according to claim 1.

6. The wiper arm according to claim 5, comprising:
    a base side and two side flanks, wherein the base side and the two side flanks extend in the longitudinal direction of the wiper arm and the base side is connected to the two side flanks such that the wiper arm has a substantially U-shaped cross section and the base side and the two side flanks define an internal space, the arrangement being arranged in the internal space and the contact surface of the at least one nozzle unit contacting the surface of one of the two side flanks.

7. The wiper arm according to claim 5, comprising a groove-type receptacle for the arrangement, wherein the receptacle is elastically deformable such that the arrangement can be clipped into the receptacle.

8. An arrangement of nozzle units for a wiper arm, wherein at least one nozzle unit:
   comprises a rigid body;
   defines a channel through which liquid can flow into the nozzle unit and/or out of the nozzle unit; and
   comprises a nozzle, which is connected to the channel,
   wherein the nozzle units are in communication with each other in series in the arrangement such that a liquid can flow from a nozzle unit into a following nozzle unit in the series, and at least two nozzle units following each other in the series are connected to each other in an articulated connection that is a spherical joint, and
   wherein at least one nozzle unit comprises a contact surface which is formed such that the nozzle unit cannot rotate about a longitudinal axis thereof if the contact surface contacts a surface of the wiper arm.

9. The arrangement according to claim 8, wherein at least two nozzle units following each other in the series are directly connected to each other.

10. The arrangement according to claim 8, wherein one of the two nozzle units comprises a rigid insert and the other nozzle unit comprises an elastic hollow counterpart, the rigid insert being configured to penetrate the elastic hollow counterpart to provide the articulated connection.

11. The arrangement according to claim 8, wherein all of the nozzles have the same orientation.

12. A wiper arm comprising the arrangement according to claim 8.

13. The wiper arm according to claim 12, comprising:
   a base side and two side flanks, wherein the base side and the two side flanks extend in the longitudinal direction of the wiper arm and the base side is connected to the two side flanks such that the wiper arm has a substantially U-shaped cross section and the base side and the two side flanks define an internal space, the arrangement being arranged in the internal space and the contact surface of the at least one nozzle unit contacting the surface of one of the two side flanks.

14. The wiper arm according to claim 12, comprising a groove-type receptacle for the arrangement, wherein the receptacle is elastically deformable such that the arrangement can be clipped into the receptacle.

* * * * *